(12) United States Patent
Botts

(10) Patent No.: US 6,409,192 B1
(45) Date of Patent: Jun. 25, 2002

(54) SLIDER PIN RELEASE MECHANISM FOR A SEMI-TRAILER

(75) Inventor: Robert D. Botts, Mount Vernon, MO (US)

(73) Assignee: Tuthill Corporation, Burr Ridge, IL (US)

( * ) Notice: Subject to any disclaimer, the term of this patent is extended or adjusted under 35 U.S.C. 154(b) by 0 days.

(21) Appl. No.: 09/635,581

(22) Filed: Aug. 9, 2000

(51) Int. Cl.⁷ ................................................. B60G 5/06
(52) U.S. Cl. ................................ 280/149.2; 280/407.1; 180/24.02
(58) Field of Search ..................... 180/24.02; 280/149.2, 280/407.1; 74/575, 577 S, 532

(56) References Cited

U.S. PATENT DOCUMENTS

| 4,045,001 A | * | 8/1977 | Harvey, Jr. ................. 254/164 |
| 4,742,737 A | * | 5/1988 | Hatfield ....................... 81/355 |
| 4,838,566 A | * | 6/1989 | Baxter et al. ............. 280/149.2 |
| 5,137,296 A | | 8/1992 | Forman |
| 5,378,006 A | | 1/1995 | Stuart et al. |
| 5,480,171 A | * | 1/1996 | Cheffey ................... 280/149.2 |
| 5,546,828 A | * | 8/1996 | Golarz ......................... 74/512 |
| 5,564,725 A | * | 10/1996 | Brazeal ................... 280/149.2 |
| 5,720,489 A | | 2/1998 | Pierce et al. |
| 5,813,682 A | | 9/1998 | Stevens |

* cited by examiner

Primary Examiner—Kenneth R. Rice
Assistant Examiner—Christopher Buchanan
(74) Attorney, Agent, or Firm—George Pappas

(57) ABSTRACT

A slider pin release mechanism for a slider suspension system of a semi-trailer which includes a trailer body and a slider suspension which is movable longitudinally forwardly and rearwardly relative to the trailer body. Locking pins carried on the slider suspension are movable laterally into and out of locking engagement with the slider suspension and the trailer body. A longitudinally extending pivot rod connects to the locking pins. A ratchet gear is affixed to the forward end of the pivot rod. A handle is mounted on the pivot rod for rotation relative to the ratchet gear. A drive pawl is mounted on the handle and engages the ratchet gear to drive the ratchet gear upon rotation of the handle. A holding pawl is engageable with said ratchet gear. A drive pawl release rod is connected to the drive pawl. The drive pawl includes a release tooth which is moved into contact with the holding pawl to disengage the holding pawl from the ratchet gear.

4 Claims, 3 Drawing Sheets

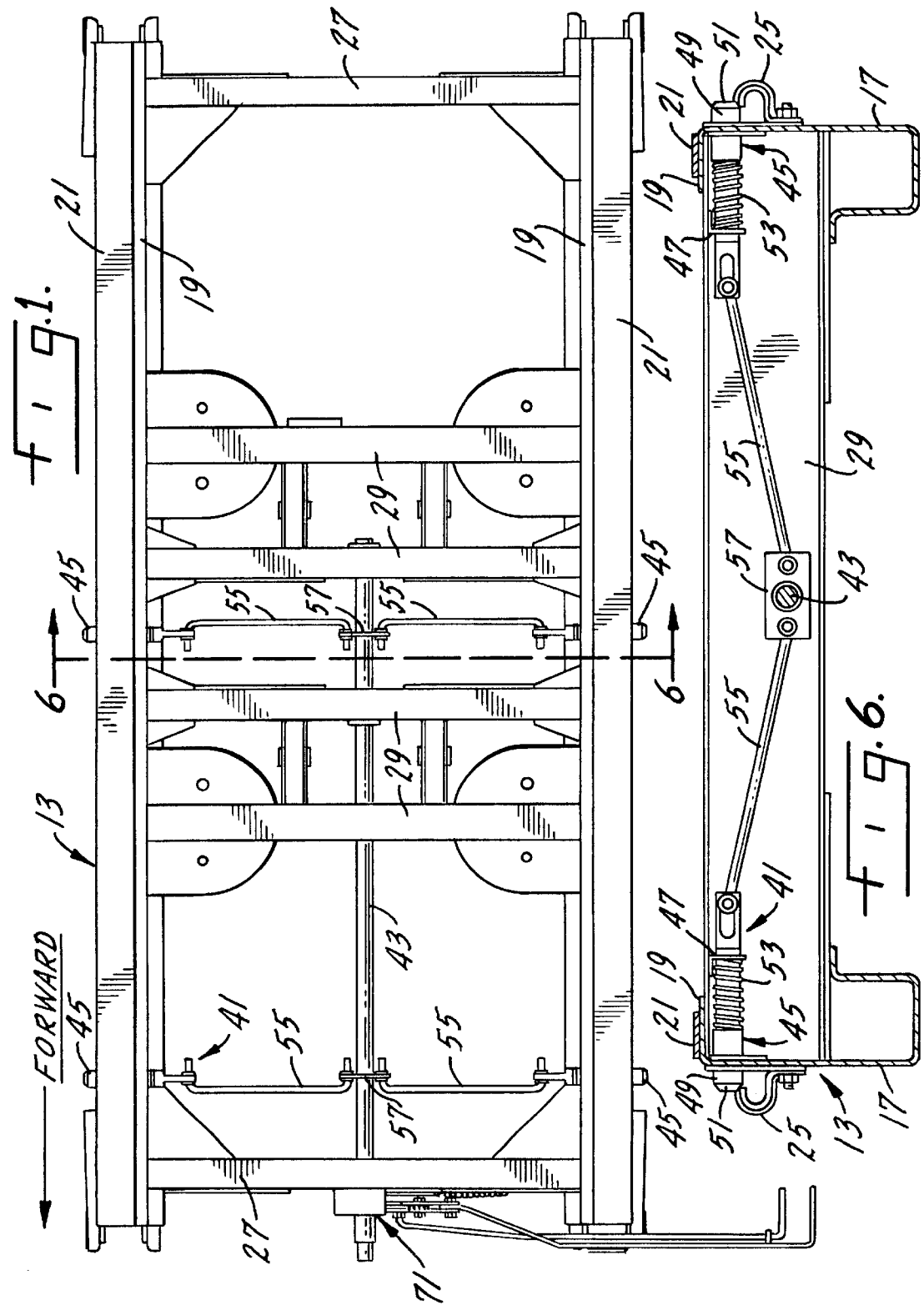

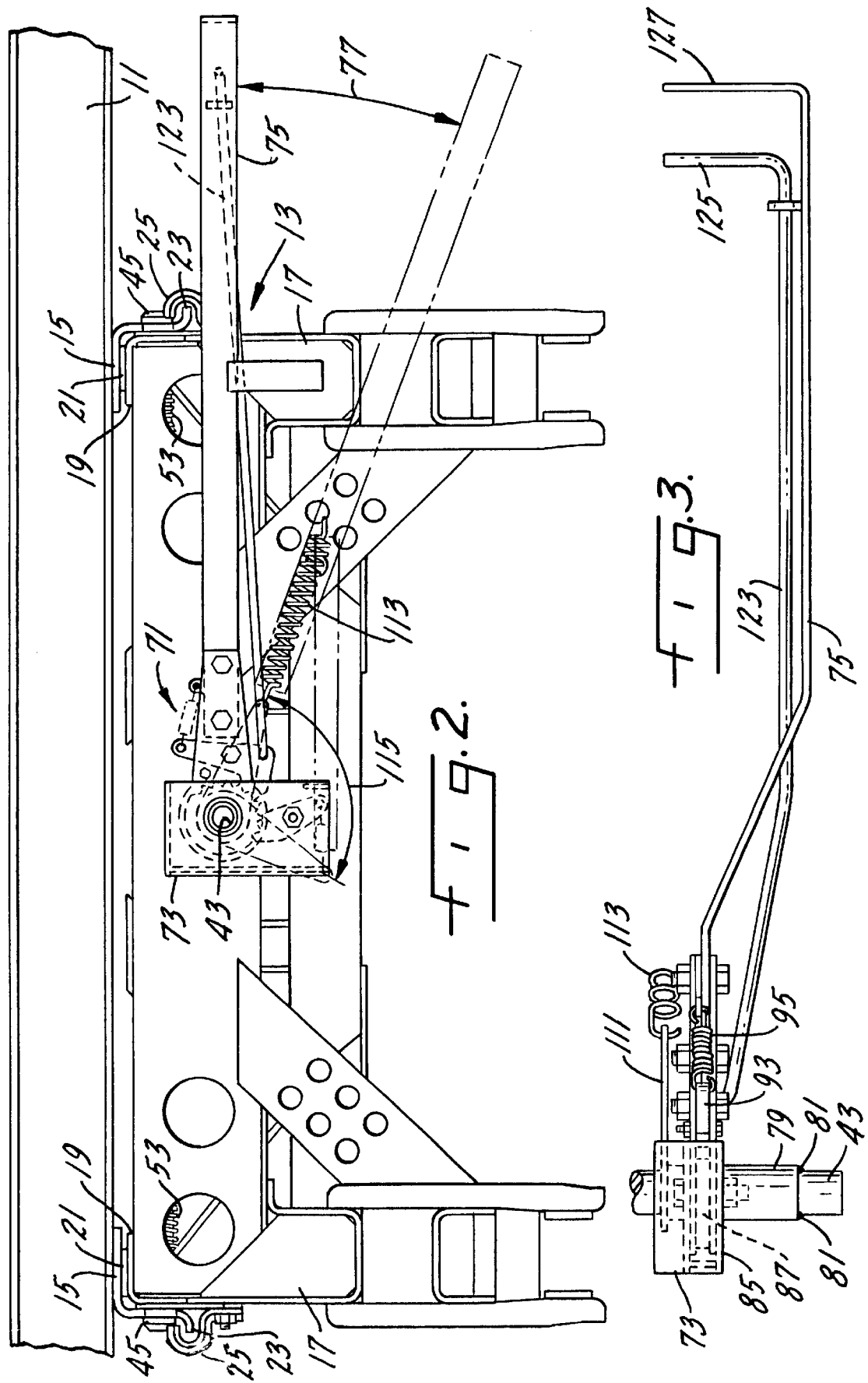

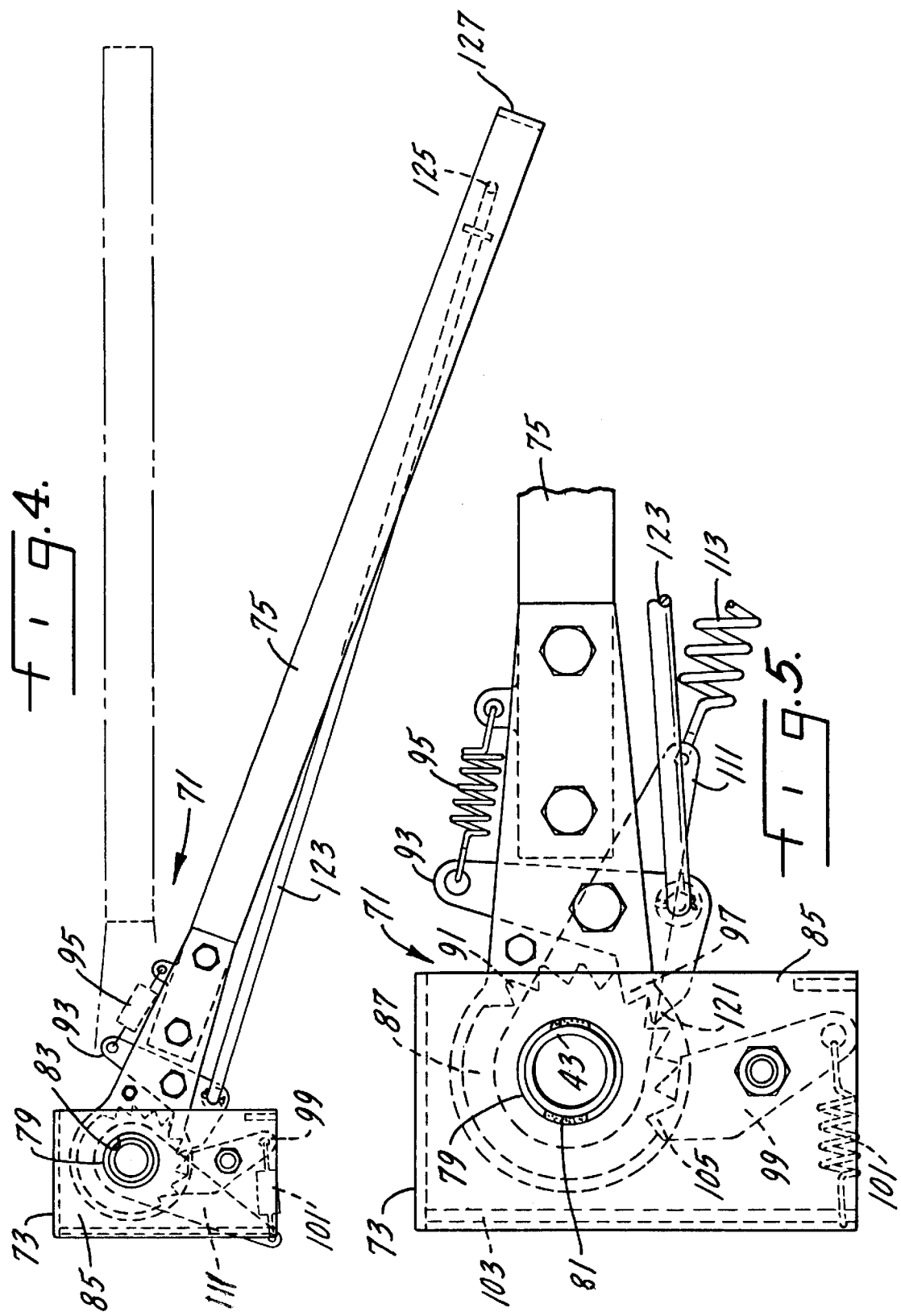

SLIDER PIN RELEASE MECHANISM FOR A SEMI-TRAILER

THE FIELD OF THE INVENTION

This invention is directed to a slider pin release mechanism for a slider suspension system for a semi-trailer. Movable subframes, typically referred to as sliders, have been utilized on semi-trailers for many years. The slider is conventionally mounted on the underside of the trailer body and the trailer body is movable longitudinally relative to the slider to provide a means of variable load distribution on the axles. A trailer having a slider gains an advantage with respect to laws governing maximum axle load. Proper placement of the trailer body relative to the slider varies individual axle loads and redistributes the trailer load so that it is within legal limits. Once the trailer body is properly positioned, the trailer body is locked in place with the slider by a retractable pin mechanism, usually including four pins with two located on each side of the slider.

The retractable pin mechanism of the prior art was actuated by a pull rod accessible from a side of the trailer. The pull rod was connected through a crank, shaft and rod mechanism to the individual retractable pins located on opposite sides of the slider. When the vehicle operator wished to retract the pins in order to move the trailer body relative to the slider, the operator pulled the pull rod in an outwardly direction. This pulling required the application of considerable amount of force by the operator because the crank, shaft and rod mechanism provided relatively little mechanical advantage.

While the prior art slider suspension is effective in varying individual axle loads, it has several disadvantages. One disadvantage of the prior art slider suspension is the difficulty of retracting the pins once the retractable pin mechanism becomes corroded. A trailer is transported through all types of road and environmental conditions. Moisture and corrosive contaminants, such as salt, will often cover the retractable pin mechanism thus corroding the mechanism making the retractable pin mechanism very difficult to operate. The small mechanical advantage provided by the crank arm often proved to be insufficient to retract the pins.

Another disadvantage of the prior art slider suspension, is the lack of verification of the retraction of the pins in the inboard direction allowing the trailer to slide along the slider. Without verification that the pins are fully retracted, the operator may attempt to slide the trailer body relative to the slider with the pins only partially retracted thereby damaging the pin mechanism.

Another disadvantage of the prior art slider suspension, is the difficulty of re-engaging the pins with the semi-trailer frame when the slider was relocated to its new position. The operator was dependent on the small mechanical advantage provided by the pull rod (which had to be used as a push rod) and the individual compressed coil springs acting on each pin to reinsert it.

SUMMARY OF THE INVENTION

The present invention is directed generally to an improved slider pin mechanism for a slider suspension system of a vehicle semi-trailer.

An object of this invention is a slider pin mechanism which utilizes a handle and a ratchet gear mechanism to provide an increased mechanical advantage to enable an operator to more easily disengage slider pins to allow readjustment of the slider.

Another object of this invention is a slider pin mechanism which will positively indicate to an operator that the slider pins have been fully retracted.

Yet another object of this invention is a slider pin mechanism which assists the operator in re-engaging the slider pins when the slider suspension is positioned in its new location.

Other objects of the invention will be found in the following specification, claims and drawings.

BRIEF DESCRIPTION OF THE DRAWINGS

The invention is illustrated more or less diagrammatically in the following drawings wherein:

FIG. 1 is a top view of a slider for a semi-trailer of the present invention, showing a retractable pin mechanism;

FIG. 2 is a front view of the slider shown in FIG. 1;

FIG. 3 is a top view of the ratchet assembly of FIG. 1;

FIG. 4 is a front view of the ratchet assembly of FIG. 1;

FIG. 5 is an enlarged fragmentary front view of the ratchet of FIG. 4 with the handle in the up position; and FIG. 6 is a cross sectional view of the slider taken along FIG. 6—6 of FIG. 1.

DESCRIPTION OF THE PREFERRED EMBODIMENT

FIGS. 1, 2 and 6 of the drawings illustrate a frame 11 of a semi-trailer body on which the slider suspension 13 of this invention is mounted for forward and aft movement. Longitudinally extending rail guides 15 are attached to the underside of the frame 11 as shown in FIG. 2 to receive and guide the slider suspension. The slider suspension is formed with hollow, box-like longitudinally extending side beams 17 which has formed integrally therewith an inwardly turned slide plate 19 which fits under in alignment with the rail guide 15. A low friction strip 21 is mounted on the top of the in turned slide plate 19 to engage the rail guide 15 for ease of movement of the slider suspension relative to the frame. As can be seen most clearly in FIG. 2 of the drawings, the rail guides 15 attached to the trailer frame 11 have out turned ends 23 which are received in channels 25 connected to the slide plate 19 of the suspension side beams 17. The slider suspension also includes transversely extending end beams 27 and intermediate cross beams 29 which connect to the slider suspension side beams 17 as is well known in the art.

Also mounted on the slider suspension 13, and also well known in the art, is a retractable pin mechanism 41 shown most clearly in FIGS. 1 and 6 of the drawings. The retractable pin mechanism includes a pivot rod 43 which extends from the front end of the slider suspension to approximately the middle thereof midway between the suspension side beams 17 and is supported on the slider suspension for rotation. A plurality of retractable locking pins 45, two on each side of the slider suspension are mounted on and extend through brackets 47 affixed to the slider suspension. Each locking pin includes a head 49 having a chamfered tip 51 which fits through aligned holes (not shown) in the rail guides of the trailer frame 11 and the slide plates 19 of the slider suspension 13 to prevent movement of these members relative to each other. Each locking pin is biased to its outward or locking position by a coil spring 53 which engages a head 49 of the pin and a bracket 47. The inner end of each pin is connected to one end of a rod 55 whose opposite end connects to a rectangular plate 57 which is affixed to and rotates with the pivot rod 43. In the prior mechanism, the plate 57 was rotated by a pull rod to rotate the pivot rod and retract the locking pins 45. In this invention, the pull rod is replaced by a handle and ratchet gear mechanism 71.

The handle and ratchet mechanism 71 of this invention is shown in location in FIG. 1 and. in detail in FIGS. 2, 3, 4 and 5. As can be best seen in FIG. 1, the mechanism 71 is located on the front side of the front end beam 27 of the slider suspension 13 in alignment with the pivot rod 43. The mechanism is partially enclosed in a housing 73 attached, as by welding, to the front side of the front end beam 27. It includes an elongated handle 75 that in its non-operating position extends horizontally and outwardly of the slider suspension as viewed in FIG. 2 where it can be manipulated by an operator. The handle can be rotated through the arc indicated by the arrow 77 in FIG. 2. At its inner end, the handle is affixed to a cup-like sleeve 79 that is journalled at its outer end 81 in a bearing 83 supported in an outer vertical wall 85 of the housing 73. A ratchet gear 87 is affixed to a sleeve 89 that telescopes over and is fastened to the outer end of pivot rod 43. The cup-like sleeve 79 carrying the handle 75 is journalled on the ratchet gear sleeve 89. The ratchet gear 87 is formed with a number of ratchet teeth 91 on the peripheral edge thereof which face the handle 75. The teeth are shaped to permit the ratchet gear to be driven in a clockwise direction as viewed in FIG. 5 of the drawings. The ratchet gear can be driven by a drive pawl 93 pivotally mounted on the handle 75. A tension spring 95 rotates a drive tooth 97 of the drive pawl into mesh with a ratchet tooth 91 of ratchet gear 87 as is shown most clearly. in FIG. 5 of the drawings. A holding pawl 99 is pivotally mounted on the outer wall 85 of the housing 73. The holding pawl is biased into meshing engagement with the ratchet gear by an extension spring 101 anchored to a side wall 103 of the housing. Engagement of the teeth 105 of the holding pawl with the ratchet teeth 91 of the ratchet gear 87 will prevent the ratchet gear from rotating in a counterclockwise direction as viewed in FIG. 5 of the drawings.

A return arm 111 for the pivot rod 43 is most clearly shown in FIGS. 2, 3, 4 and of the drawings. Its function is to return the pivot rod 43 to its original position in which the locking pins 45 of the retractable pin mechanism 41 are in their extended positions of engagement as can be best seen in FIG. 6 of the drawings. The return arm through the force loaded into its tension spring 113 and its rigid attachment to the pivot rod 43 assists in seating the locking pins 45 to secure the slider suspension 13 to the semi-trailer frame 11. The position of rotation of the return arm 11 when the locking pins are engaged is shown in FIGS. 2, 3 and 5 of the drawings. The arrow 115 in FIG. 2 shows the arc through which the return arm 111 is rotated during ratching movement of the ratching gear 87 by cranking rotation of the elongated handle 75. It should be noted that the arc, indicated by arrow 115, through which the return arm travels during cumulative rotation of the ratchet gear 87 is greater than the arc, indicated by the arrow 77, through which the handle 75 is moved during any one of its operational movements.

To release the holding pawl 99 and allow the ratchet gear 87, return arm 111 and pivot rod 43 to return to their original positions before rotation, the drive pawl 93 is equipped with a release tooth 121 at one end thereof. When the ratchet wheel has been ratched to its maximum, about five ratching of the handle 75, a pull rod 123 pivotally attached to a lower portion of the drive pawl is pulled to the right as viewed in FIG. 5 to disengage the drive pawl from the teeth 91 of the ratchet gear 87 to a more horizontal position, as viewed in FIG. 5, to position the release tooth 121 in contact with the holding pawl. Then, clockwise rotation of the handle 75 will release the teeth 105 of the holding pawl 99 from engagement with the teeth 91 of the ratchet. The stored force in the return arm tension spring 113 will return the pivot rod 43 to its initial position of rotation and return the locking pins 45 to their locking positions.

To facilitate rightwardly movement of the pull rod 123, the pull rod is equipped with an inturned grip 125 and the handle 75 is equipped with a similar grip 127, shown in FIG. 3 of the drawings. When the operator wishes to move the release tooth 121 of the drive pawl 93 against the holding pawl 99, the grips 125 and 127 are squeezed together.

Once the handle 75 is in the upper position, the handle 75 is ready to be pushed down again to further rotate the ratchet gear 87 clockwise. This process of pushing the handle 75 down to rotate the ratchet gear 87 clockwise, thus further retracting the pins 45 inboard, continues until the pins 45 are fully retracted. Fully retracted pins are achieved at the point where the pins 45 are entirely inboard. The embodiment, as shown, illustrates five teeth 91 counter-clockwise of the initial position of the driving pawl 93. For this embodiment, the pins 45 are fully retracted once the teeth 97 of the driving pawl 93 are seated between the counter-clockwise most teeth 91 of the ratchet gear. Therefore for this embodiment, to fully retract the pins 45, the operator would always cycle the handle 75 five times. This consistency in the number of cycles required to fully retract the pins provides the operator with verification that the pins are fully retracted.

After the pins 45 are fully retracted, the trailer frame 11 is positioned relative to the slider suspension 13 for optimum load distribution. The trailer frame 11 is moved longitudinally along its rail guides 15 until the openings formed in the rails are aligned with the openings formed in the trailer frame with the axle loads at the desired distribution.

To lock or extend the pins 45 in the outboard position, the operator first pulls the release grip 125 of the release pull rod 123 toward the release grip 127 of the handle 75. The axially outward movement of the release pull rod 123 pivots the driving pawl 93 counter-clockwise and causes the release tooth 121 of the driving pawl 93 to disengage between the teeth 91 of the ratchet gear 87. The operator then pushes down on the handle 75 until the driving pawl 93 abuts the holding pawl 99. Further downward motion of the handle 75 causes the holding pawl 99 to rotate counterclockwise and the tooth 105 of the holding pawl 99 to disengage between the teeth 91 of the ratchet gear 87.

With the teeth 97 and 105 of both the driving pawl 93 and the holding pawl 99 disengaged between the teeth 91 of the ratchet gear 87, the ratchet gear and the pivot rod 43 are free to rotate. The coil springs 53 located between the bracket 47 and the enlarged diameter head 49 of the pins 45 expand in the outboard direction, thus pushing the pins 45 outboard through the aligned apertures in the frame and slider suspension. As the pins 45 are pushed in the outboard direction, the pins 45 pull the rods 55 in the outboard direction. Since the rods 55 are pivotally mounted to the end of the rectangular plate 57, the axially outboard movement of the rods 55 rotates the rectangular plate 57 counterclockwise. With counter-clockwise torque created by the bias of the return arm spring 113 in conjunction with the counterclockwise torque on the rectangular plate 57, the pivot rod 43 and the ratchet gear 87 rotate counterclockwise to its initial position.

Various features of the present invention have been described with reference to the preferred embodiment. It should be understood that modifications may be made to the slider suspension system for a semi-trailer without departing from the spirit and scope of the present invention as represented by the following claims.

What is claimed is:

1. A slider pin release mechanism for a slider suspension system of a semi-trailer having a trailer body, said slider pin release mechanism including:

a slider suspension movable longitudinally forwardly and rearwardly relative to said trailer body, a plurality of locking pins carried by said slider suspension and movable laterally into and out of locking engagement with said slider suspension and said trailer body, a rod connecting each locking pin to a plate, said plate attached to a longitudinally extending pivot rod carried on said slider suspension, said longitudinally extending pivot rod including a forward end, a ratchet gear affixed to said forward end of said pivot rod, a handle mounted on said pivot rod for rotation relative to said ratchet gear, a drive pawl mounted on said handle and engageable with said ratchet gear to drive said ratchet gear upon rotation of said handle, a holding pawl engageable with said ratchet gear, and a drive pawl release rod connected to said drive pawl.

2. The slider pin release mechanism of claim 1 in which said ratchet gear is mounted on a sleeve and said sleeve is affixed to said pivot rod.

3. The slider pin release mechanism of claim 1 in which a return arm is affixed to said pivot rod and a spring biases said return arm.

4. The slider pin release mechanism of claim 1 in which said drive pawl includes a release tooth, said release tooth is moved into contact with said holding pawl by operation of said drive pawl release rod to disengage said holding pawl from engagement with said ratchet gear.

* * * * *

UNITED STATES PATENT AND TRADEMARK OFFICE
CERTIFICATE OF CORRECTION

PATENT NO. : 6,409,192 B1
DATED : June 25, 2002
INVENTOR(S) : Robert D. Botts

It is certified that error appears in the above-identified patent and that said Letters Patent is hereby corrected as shown below:

<u>Column 3,</u>
Line 4, change "and." to -- and --
Line 27, change "clearly." to -- clearly --
Line 38, change "and of" to -- and 5 of --
Line 58, change "111and" to -- 111 and --

Signed and Sealed this

Twentieth Day of August, 2002

Attest:

JAMES E. ROGAN
*Attesting Officer*  *Director of the United States Patent and Trademark Office*